July 21, 1931.  C. W. ROBINSON  1,815,330
DUPLEX GRAIN DRILL STRUCTURE
Filed July 13, 1929   3 Sheets-Sheet 2

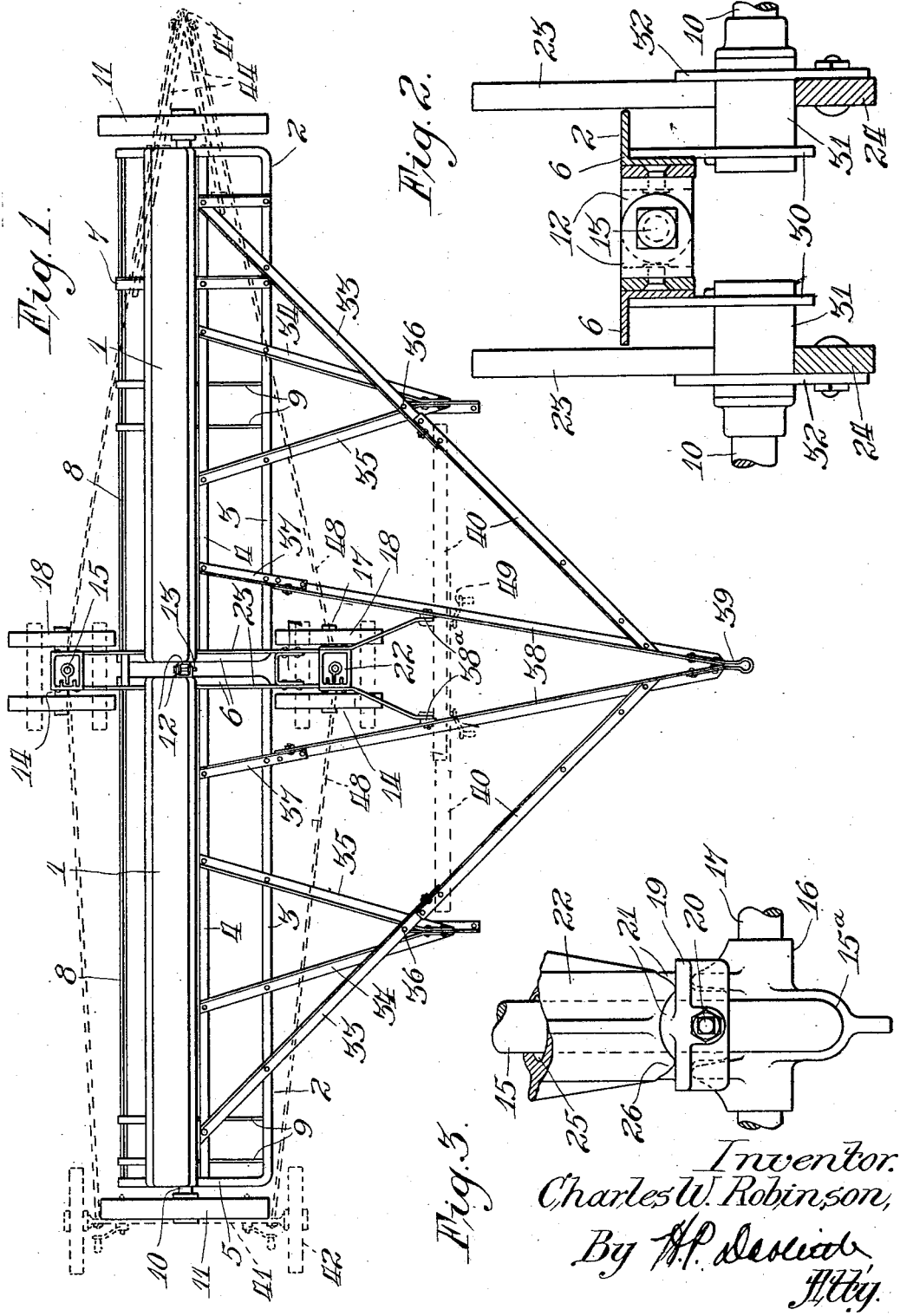

Inventor.
Charles W. Robinson
By ......
Atty.

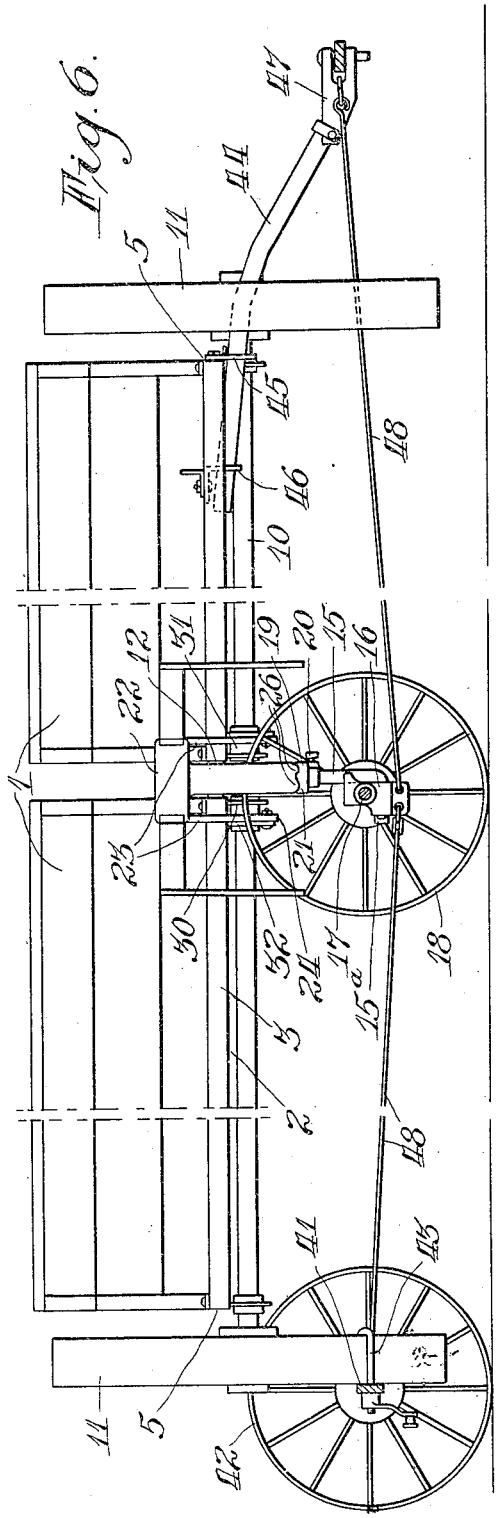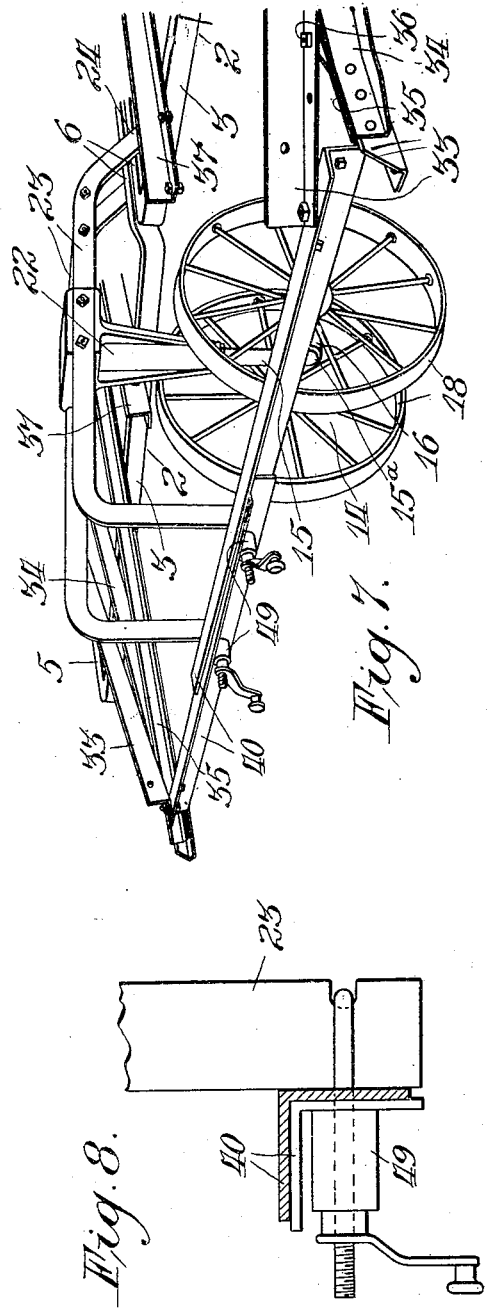

Patented July 21, 1931

1,815,330

UNITED STATES PATENT OFFICE

CHARLES W. ROBINSON, OF HAMILTON, ONTARIO, CANADA, ASSIGNOR, BY MESNE ASSIGNMENTS, TO INTERNATIONAL HARVESTER COMPANY, OF CHICAGO, ILLINOIS, A CORPORATION OF NEW JERSEY

DUPLEX GRAIN DRILL STRUCTURE

Application filed July 13, 1929. Serial No. 377,997.

This invention relates to transports for agricultural implements. More particularly it relates to the frame organization transport means for grain drills of the duplex type, in which two independent standard units are connected end to end. The invention also relates to means for attaching the transport means and to means for adapting the transport means for endwise movement of the implement, as well as in the normal operating direction.

The principal object of the invention is to construct and provide for the attachment of an improved transport for duplex implements such as grain drills, which will give the desired support to the connected implements and have the proper flexibility for traveling over uneven ground. Another object is to construct such a transport which will easily turn about a short radius. Another object is to provide a transport easily and quickly convertible for moving the implements in a direction at right angles to the normal direction at which they are moved during operation. Other objects will be apparent from the detailed description to follow.

The object of the invention is accomplished by pivoting two grain drills or similar implement carrying frames together, end to end, and providing a novel transport carriage for the adjacent ends. The outer ends are supported by the usual wheels. Angle bars are attached to suitable points on the frames and to a clevis at a point forward from the center of the pivoted frame structure, to provide draft means.

The center transport carriage is of a novel construction, which is hereinafter described in detail. For endwise movement of the connected drills, a separate truck is provided for one end to raise the wheel from the ground. A stub tongue attached to the other end is provided for attaching to a drawbar. The frame of the center carriage is adapted to be raised to lift the adjacent ends of the implement frames.

The details of the improved transport frame structure of this invention are shown in the drawings, and the construction and operation are explained in the detailed description which follows.

In the drawings:

Figure 1 is a top plan view of a duplex grain drill embodying the novel organization transport means of this invention. The dotted lines show the transport elements connected for endwise movement of the drill;

Figure 2 is an enlarged side elevation, partly in section, of the hinge structure for pivotally joining the two frame sections together at the center;

Figure 3 is an enlarged detail view of the means for pivoting the carriage trucks to the frame;

Figure 6 is a side elevation of the duplex drill arranged for endwise movement;

Figure 7 is an enlarged perspective view of the front part of the center carriage; and Figure 8 shows one of the clamping means for fastening the draft means in collapsed position.

Figure 4:
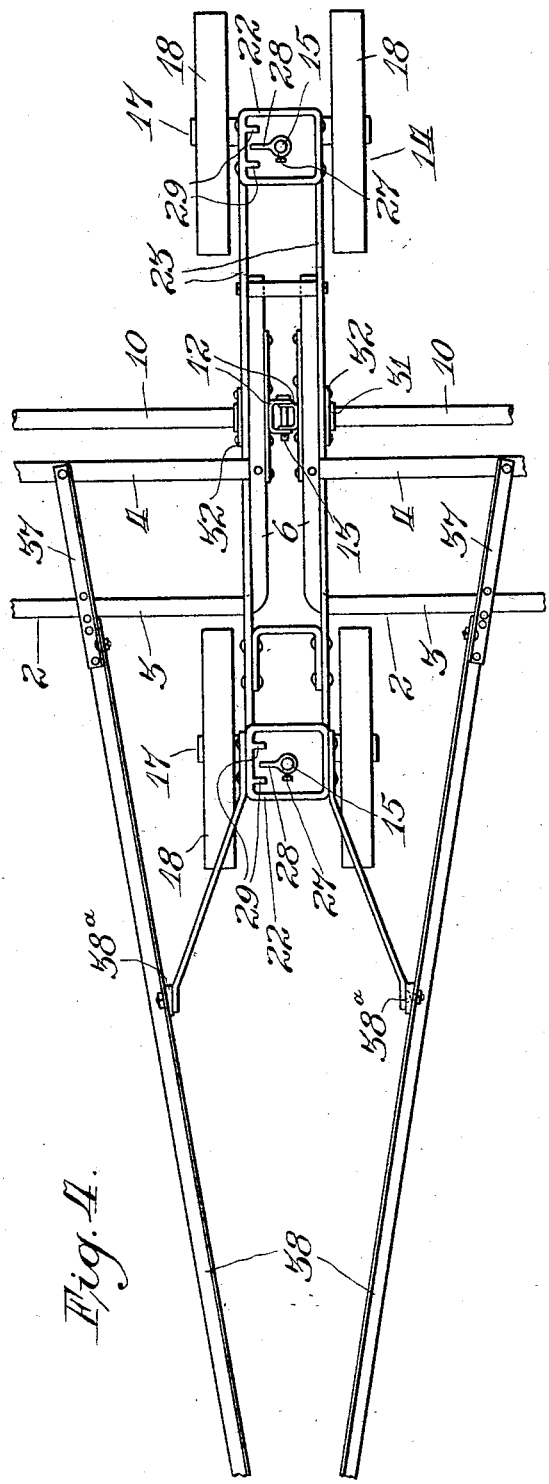
Figure 4 is a top plan view showing the center connection and transport carriage.

In the duplex drill shown in the drawings, two similar grain drills are shown positioned end to end. Each drill has a hopper 1 mounted on a frame 2. The frame consists of front angle bars 3, back angle bars 4, outer end angle bars 5, and inner end angle bars 6. The end bars 5 and 6, as well as similar rearwardly extending bars 7, support a rockshaft 8, clearly shown in Figure 5. Suitable drill mechanisms 9 are supported from the front frame members 3 and the rockshaft 8. Axles 10 are attached to the outer ends of the frames 2, and wheels 11 are mounted thereon. The adjacent ends of the frames are hinged, as shown in Figures 2 and 4, by two cooperating channel sections 12, secured to the end members 6 of the respective drill frames and pivotally joined by a pin 13.

Figure 5:
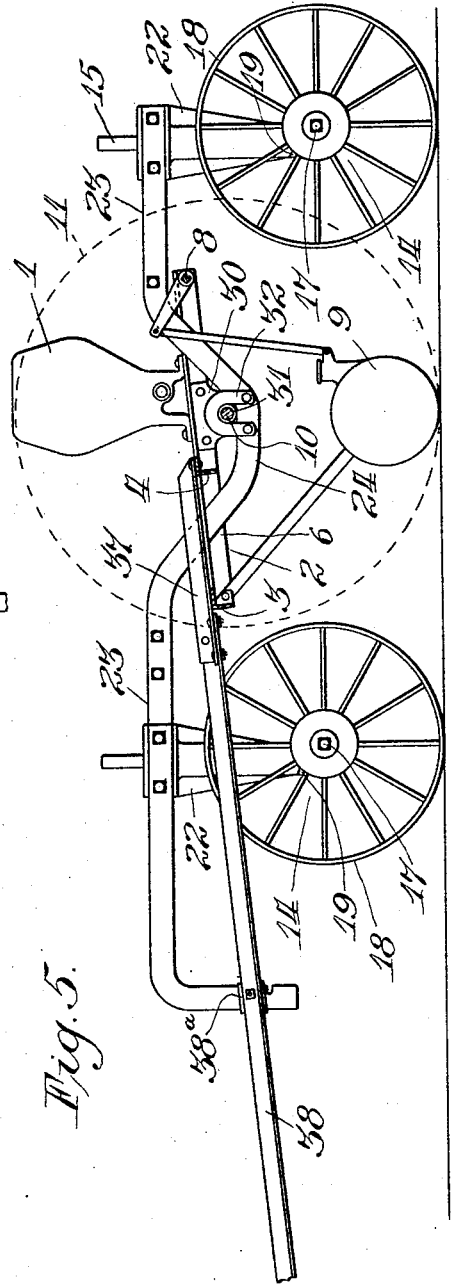
Figure 5 is a side elevation, showing the center carriage and the parts of the drill closely associated with it.

The center carriage construction is best shown in Figures 3, 5 and 7. Similar double wheel trucks 14 are secured to vertical standards 15 by connection castings or heads 16. The castings 16 join the axles 17 of the trucks to the standards 15 in offset relationship, as clearly shown in Figure 6, the heads 16 being pivoted on the rearwardly bent ends 15ᵃ of the standards for limited rocking movement. Wheels 18 are mounted on the truck axle 17 by any suitable means. Cam collars 19 are mounted on the standards 15 and secured thereto by set screws 20. The upper part of the cam collars 19 are provided with a plurality of cam surfaces 21, which are positioned around the cam collar at 90 degree intervals.

The frame of the center carriage consists of two similar castings 22, which will be designated as carriage blocks, and two side members 23.

The side members 23 are flat bars and are dipped down intermediate their ends to form yokes 24. The side members 23 are rigidly secured to the carriage blocks 22 at both ends and are spaced apart a distance equivalent to the width of said blocks. The carriage blocks 22 have vertical bores 25, through which the vertical standards 15 of the trucks extend. At the bottom the carriage blocks are provided with cam surfaces 26, which mate with the cams 21 on the cam collars 19. The vertical standards 15 extend above the carriage blocks and are provided with stop collars 27, as shown in Figure 4. These collars are rigidly secured to the shafts and are provided with extensions 28, which are positioned between stops 29 on the carriage blocks.

At the hinged ends of the drill frames 2, the end angle bars 6 are provided with downwardly extending hanger plates 30, which support axle boxes 31, shown in Figure 5. The yoke 24 on the carriage side bars 23 extends downwardly from the front between the front frame members 2 and the rear frame members 3, under the axle boxes 31, and upwardly in front of the rearwardly mounted rockshaft 8. The axle boxes 31 rest on the yokes and U-straps 32 extend over the axle boxes loosely retaining them in position and are secured to the yokes.

Angle bars are secured to the implement frames and to the clevis to the front thereof, to form draft means. The angle bars 33, 34, and 35 are rigidly secured to the frame and are secured together by a clamping means 36. Short hitch bars 37 are rigidly secured to the frames 2. Hitch bars 38 are detachably secured to the short bars 37 and to a clevis 39.

Angle bars 40 are secured to an extension of the bars 33 and to the hitch bars 38 adjacent the clevis.

The carriage side bars 23 extend forwardly and outwardly from the front carriage block and slidably engage blocks 38ᵃ which are secured to the hitch bars 38, intermediate their ends. Figures 7 and 8 show the angle bars 40 in a horizontal position and secured to the extending portions of the side bars 23 by clamps 49.

An auxiliary two-wheeled truck, shown in Figure 6, is utilized for endwise transportation of the drill. The auxiliary truck has a flat axle bar 41 and wheels 42 mounted thereon. Hook clamps 43 are provided for detachably securing the axle 41 to the rim of the drill wheel 11.

A short stub tongue 44 is provided for one end of the drill during endwise movement. It extends through an anchor plate 45 attached to the end member 6 of one of the frames and into an opening in a hanger member 46 attached to the frame. The stub tongue is provided with a clevis 47. Truss rods 48 are provided for connecting the center connections 16 of the carriage trucks with the auxiliary truck axle bar 41 and with the clevis 47 of the stub tongue. The rods 48 provide means for securing and maintaining the trucks in the adjusted position.

In the normal operation of the grain drill described herein, draft is applied to the clevis 39 and is substantially uniformly distributed through the angle bars to the frames 2. When the drill is passing over uneven ground, the hinge connection between the frames permits the outer ends to raise or lower. The yokes 24 on the carriage side bars yield sufficiently to give the desired flexibility without undue strain on any of the parts.

When the carriage trucks encounter uneven ground or obstacles, they are free to rotate or oscillate within the limits determined by the stop collars 27 and the stops 28 on the carriage blocks 22.

The cam surfaces 21 on the cam collar 19, and the cam surfaces 26 on the carriage blocks 22 provide bearing means for the oscillation of the trucks with respect to the center carriage. Any turning of the trucks tends to raise the carriage with respect to the trucks due to the nature of the cam surfaces. Likewise, the weight carried by the carriage frame tends to bring the trucks back into position, the mating cams forming means for resisting the rotation of the trucks.

When the drill is turned about a short radius, a side thrust is exerted on the trucks. The offset axles of the trucks are positioned with the offset to the rear of the vertical shafts. The turning side thrust, therefore, tends to rotate the trucks in the same direction as the turning of the drill. In such positions, they offer the minimum resistance to movement and have no tendency to dig up the soil.

In implements of wide dimensions, such as duplex drills, it is desirable to provide means for transporting in an endwise direction for moving the implement to and from the fields, or for similar transportation. The construction of the center carriage of this invention makes it readily convertible into means for endwise transport.

When the drill is to be arranged for endwise transport, one end is jacked up and the auxiliary truck is attached, as shown in Figure 6, by clamping the flat axle 41 to the wheel 11 with the hook clamps 43.

The center of the drill is elevated above its normal ground engaging position by raising the center carriage frame above the trucks.

This is accomplished by loosening stop collars 27 and the cam collars 19. The carriage blocks are then raised on the vertical shafts 15 and the cam collars are secured in position, as shown in Figure 6. The trucks are so mounted under the carriage blocks that they may be turned at right angles to their forward position, or parallel to the drill frames, with the truck axle offset from the vertical shaft in the direction of the auxiliary truck. The long hitch bars 38 are removed and the angle bars 40 are folded parallel to the frame and secured to the extending portions of the carriage side bars 23 by hook clamps 49 as shown in Figures 7 and 8.

The stub tongue 44 is placed in position, and the truss rods 48 are attached to the clevis 47, the truck castings 16, and the auxiliary truck axle 41. The truss rods give the carriage frame sufficient rigidity to prevent undue strain on the side members 23 during endwise movement. The truss rods also transmit the draft applied to the stub tongue to the carriage trucks 14 and to the auxiliary truck without producing an undue endwise pull on the drill frames and the center connection 12.

Although this invention has been shown and described as embodied in a grain drill, it may be utilized wherever two implements are to be connected together for joint operation, particularly whenever it is desired to have a transporting means readily convertible for movement in either of two directions at right angles to each other.

What is claimed is:

1. A duplex implement comprising two implement frames positioned side by side, a hinge pivotally connecting said frames at the adjacent sides, wheels mounted at the outer ends of the frames and a carriage supporting the connected sides, said carriage comprising a frame having side bars attached to the implement frames adjacent the hinge, and trucks mounted under the carriage frame.

2. A duplex implement comprising two transversely extended implement frames positioned end to end, wheels mounted at the outer ends of the frames and a carriage positioned at the adjacent ends, said carriage comprising carriage blocks positioned to the rear and in front of the adjacent ends, side bars attached to the blocks and to the implement frames near the adjacent ends, bars rigidly attached to one of the blocks and to the frame, said bars being resilient to provide for relative movement of said frames, and trucks mounted in the carriage blocks.

3. A duplex implement comprising two transversely extended implement frames positioned end to end and hinged together, wheels mounted at the outer ends of the frames and a carriage positioned at the adjacent ends, said carriage comprising carriage blocks positioned to the rear and in front of the adjacent ends, a pair of side bars connecting the blocks and loosely connected to the implement frames near the adjacent ends, and trucks mounted under the carriage blocks.

4. In transport means for duplex implements, a center carriage comprising a front carriage block, a rear carriage block, spaced side bars rigidly secured to said blocks, trucks mounted under the carriage blocks for rotation about a vertical axis with respect thereto, means for limiting the rotation of the trucks, and means for resisting the limited rotation.

5. In transport means for duplex implements, a center carriage comprising a front carriage block, a rear carriage block, spaced side bars rigidly secured to the carriage blocks, trucks mounted under said blocks for rotation about a vertical axis with respect thereto, means for resisting the rotation of the trucks, said trucks being mounted for rotation about their axes at right angles to their normal direction of movement, and means for rigidly securing the trucks in the adjusted position.

6. In transport means for duplex implements, a center carriage comprising a front carriage block, a rear carriage block, spaced side bars rigidly secured to the carriage blocks, trucks mounted under said blocks for rotation about a vertical axis with respect thereto, means for resisting the rotation of the trucks, means for vertically adjusting the trucks with respect to the carriage blocks, said trucks being mounted for rotation about their axes at right angles to their normal direction of movement, and means for rigidly securing the trucks in the adjusted position.

7. A duplex implement comprising two laterally extended implement frames positioned end to end, implements mounted on said frames in operative position, a hinge pivotally connecting the frames at the adjacent ends, wheels mounted at the outer ends of the frames, a center carriage at the hinged connection, said carriage having longitudinally extended spaced side bars respectively attached to the adjacent ends of the frames, and draft means attached to the frames.

8. A duplex implement comprising two transversely extended implement frames positioned end to end, implements mounted on said frames in operative position, a hinge pivotally connecting the frames at the adjacent ends, wheels mounted at the outer ends of the frames, a center carriage at the hinged connection, said carriage having spaced side bars attached to the adjacent ends of the frames and tandem trucks to the front and behind the frame connection, and draft means attached to the frames.

9. A duplex implement comprising two transversely extended implement frames positioned end to end, implements mounted on said frames in operative position, a hinge pivotally connecting the frames at the adjacent ends, wheels mounted at the outer ends of the frames, a center carriage at the hinged connection, said carriage having spaced side bars attached to the adjacent ends of the frames and tandem trucks to the front and behind the frame connection, said trucks being mounted for angular movement in different directions, means for maintaining the trucks in position, and draft means attached to the frames.

In testimony whereof I affix my signature.

CHARLES W. ROBINSON.